United States Patent
Oguro et al.

(10) Patent No.: US 11,225,552 B2
(45) Date of Patent: Jan. 18, 2022

(54) POLYAMIDE RESIN, MOLDED ARTICLE, AND METHOD FOR MANUFACTURING POLYAMIDE RESIN

(71) Applicant: Mitsubishi Gas Chemical Company, Inc., Tokyo (JP)

(72) Inventors: Hatsuki Oguro, Hiratsuka (JP); Tomonori Kato, Hiratsuka (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 472 days.

(21) Appl. No.: 16/074,341

(22) PCT Filed: Dec. 16, 2016

(86) PCT No.: PCT/JP2016/087554
§ 371 (c)(1),
(2) Date: Jul. 31, 2018

(87) PCT Pub. No.: WO2017/134946
PCT Pub. Date: Aug. 10, 2017

(65) Prior Publication Data
US 2020/0247949 A1 Aug. 6, 2020

(30) Foreign Application Priority Data
Feb. 2, 2016 (JP) .............................. JP2016-018080

(51) Int. Cl.
C08G 69/26 (2006.01)
C08G 69/28 (2006.01)
C08K 3/32 (2006.01)

(52) U.S. Cl.
CPC ............. *C08G 69/26* (2013.01); *C08G 69/28* (2013.01); *C08K 3/32* (2013.01)

(58) Field of Classification Search
CPC .......... C08G 56/26; C08G 69/28; C08G 3/32; C08G 69/26; C08K 3/32
USPC ...................................................... 524/414
See application file for complete search history.

(56) References Cited

U.S. PATENT DOCUMENTS

| 9,540,485 B2 * | 1/2017 | Oda ........................ B29C 48/40 |
| 2012/0065327 A1 | 3/2012 | Ogawa et al. |
| 2013/0066041 A1 | 3/2013 | Mitadera et al. |
| 2016/0046765 A1 | 2/2016 | Oda et al. |
| 2016/0347915 A1 | 12/2016 | Oda et al. |
| 2016/0376407 A1 | 12/2016 | Tsunaka et al. |

FOREIGN PATENT DOCUMENTS

| CN | 102918080 A | 2/2013 | |
| CN | 105073832 A | 11/2015 | |
| EP | 2975075 A1 | 1/2016 | |
| JP | 5120518 B2 | 1/2013 | |
| JP | 2014-111754 A | 6/2014 | |
| JP | 2014-177548 A | 9/2014 | |
| JP | 2015-017178 A | 1/2015 | |
| WO | 2010/137703 A1 | 11/2011 | |
| WO | 2012/014772 A1 | 2/2012 | |
| WO | WO-2014141978 A1 * | 9/2014 | ............ B29C 48/40 |
| WO | 2015/005201 A1 | 1/2015 | |
| WO | 2015/115148 A1 | 8/2015 | |

* cited by examiner

*Primary Examiner* — Kelechi C Egwim
(74) *Attorney, Agent, or Firm* — Fitch, Even, Tabin & Flannery LLP

(57) ABSTRACT

Provide is a polyamide resin that can yield a molded article with good appearance and good solder reflowability, while keeping low water absorption rate; a molded article; and a method for manufacturing a polyamide resin. The polyamide resin, which is composed of a structural unit derived from diamine and a structural unit derived from dicarboxylic acid; 70 mol % or more of the structural unit derived from diamine being derived from 1,4-bis(aminomethyl)cyclohexane, 1,4-bis(aminomethyl)cyclohexane having a molar ratio (cis:trans) of 35:65 to 0:100, 70 mol % or more of the structural unit derived from dicarboxylic acid being derived from a straight chain aliphatic α,ω-dicarboxylic acid having 8 to 12 carbon atoms, the polyamide resin containing 20 to 100 ppm by mass of phosphorus atom, and containing calcium atom so that the molar ratio given by (phosphorus atom):(calcium atom) will be 1:0.3 to 0.7.

16 Claims, No Drawings

POLYAMIDE RESIN, MOLDED ARTICLE, AND METHOD FOR MANUFACTURING POLYAMIDE RESIN

CROSS-REFERENCE TO RELATED APPLICATIONS

This application is a U.S. national phase application filed under 35 U.S.C. § 371 of International Application PCT/JP2016/087554, filed Dec. 16, 2016, designating the United States, which claims priority from Japanese Application Number 2016-018080, filed Feb. 2, 2016.

FIELD OF THE INVENTION

This invention relates to a novel polyamide resin, a molded article using the same, and, a method for manufacturing a polyamide resin.

BACKGROUND OF THE INVENTION

There has been known a polyamide resin obtained by polycondensing bis(aminomethyl)cyclohexane and sebacic acid. For instance, an Example in Patent Literature 1 describes a process for obtaining a polyamide resin through polycondensation of bis(aminomethyl)cyclohexane and sebacic acid in the presence of sodium hypophosphite hydrate.

CITATION LIST

Patent Literature

[Patent Literature 1] Japanese Examined Patent No. 5120518 (JP-B2-5120518)

SUMMARY OF THE INVENTION

The above-described polyamide resin has been molded and utilized in various applications, for its low water absorption rate. Molded articles obtained from the polyamide resin have increasingly been desired to have better appearance. Especially, when intended to be soldered, the molded article obtained by molding the polyamide resin is also desired to have good solder reflowability.

It is therefore an object of this invention to solve such problem, and to provide a polyamide resin that can yield a molded article with good appearance and good solder reflowability, while keeping low water absorption rate; a molded article; and a method for manufacturing a polyamide resin.

After thorough investigations in consideration of the aforementioned problems, the present inventors found that the problems may be solved by means <1> below, and preferably by means <2> to <9> below.

<1> A polyamide resin, which is composed of a structural unit derived from diamine and a structural unit derived from dicarboxylic acid; 70 mol % or more of the structural unit derived from diamine being derived from 1,4-bis(aminomethyl)cyclohexane, 1,4-bis(aminomethyl)cyclohexane having a molar ratio (cis:trans) of 35:65 to 0:100, 70 mol % or more of the structural unit derived from dicarboxylic acid being derived from a straight chain aliphatic α,ω-dicarboxylic acid having 8 to 12 carbon atoms, the polyamide resin containing 20 to 100 ppm by mass of phosphorus atom, and containing calcium atom so that the molar ratio given by (phosphorus atom):(calcium atom) will be 1:0.3 to 0.7.

<2> The polyamide resin of <1>, having a degree of crystallinity, estimated by X-ray diffractometry using the equation below, exceeding 30% and not exceeding 60%:

Degree of crystallinity (%)=[Crystalline peak area/(Crystalline peak area+Amorphous peak area)]×100.

<3> The polyamide resin of <1> or <2>, wherein the straight chain aliphatic α,ω-dicarboxylic acid having 8 to 12 carbon atoms is sebacic acid.
<4> The polyamide resin of any one of <1> to <3>, having a melting point of 230° C. or higher.
<5> The polyamide resin of any one of <1> to <4>, wherein 1,4-bis(aminomethyl)cyclohexane has a molar ratio (cis:trans) of 30:70 to 0:100.
<6> The polyamide resin of any one of <1> to <5>, wherein the calcium atom is derived from calcium hypophosphite.
<7> A molded article obtainable by molding a composition that contains the polyamide resin described in any one of <1> to <6>.
<8> A method for manufacturing a polyamide resin, comprising polycondensing a diamine and a dicarboxylic acid in presence of calcium hypophosphite, 70 mol % or more of the diamine being 1,4-bis(aminomethyl)cyclohexane, the 1,4-bis(aminomethyl)cyclohexane having a molar ratio (cis:trans) of 35:65 to 0:100, and 70 mol % or more of the dicarboxylic acid being a straight chain aliphatic α, ω-dicarboxylic acid having 8 to 12 carbon atoms.
<9> The method for manufacturing a polyamide resin of <8>, wherein calcium hypophosphite is added so that the polyamide resin will have a phosphorus atom concentration of 20 to 100 ppm by mass.

According to this invention, it now became possible to provide a polyamide resin that can yield a molded article with good appearance and good solder reflowability, while keeping low water absorption rate; a molded article; and a method for manufacturing a polyamide resin.

DESCRIPTION OF EMBODIMENTS

This invention will be detailed below. Note that "to" preceded and succeeded by numerals is used for representing a range whose lower limit and upper limit are respectively defined by these numerals.

The polyamide resin of this invention is composed of a structural unit derived from diamine and a structural unit derived from dicarboxylic acid, wherein 70 mol % or more of the structural unit derived from diamine is derived from 1,4-bis(aminomethyl)cyclohexane (may occasionally be referred to as "1,4-BAC", hereinafter); 1,4-bis(aminomethyl)cyclohexane has a molar ratio (cis:trans) of 35:65 to 0:100; 70 mol % or more of the structural unit derived from dicarboxylic acid is derived from a straight chain aliphatic α,ω-dicarboxylic acid having 8 to 12 carbon atoms; and the polyamide resin contains 20 to 100 ppm by mass of phosphorus atom, and contains calcium atom so that the molar ratio given by (phosphorus atom):(calcium atom) will be 1:0.3 to 0.7.

With such design, the obtainable molded article will have good appearance and solder reflowability, while keeping low water absorption rate. By increasing the molar ratio of trans isomer in the starting 1,4-BAC, this invention succeeded in obtaining a polyamide resin with an increased degree of crystallinity, and good reflowability.

Referring now to Patent Literature 1 (Examined Japanese Patent No. 5120518), sodium hypophosphite is used as an antioxidant (phosphorus-containing compound). When the starting monomer 1,4-BAC has a high molar ratio of trans isomer, the obtained polyamide resin will have a high melting point, and thereby, sodium hypophosphite becomes more likely to decompose during the synthesis. Although the synthesis in the laboratory scale can be carried out by carefully controlling the reaction temperature, the amount of sodium hypophosphite and so forth, it would be beneficial for industrial production to use a compound other than sodium hypophosphite as the antioxidant (phosphorus-containing compound).

Under such circumstances, the present inventors found after our investigations that usage of calcium hypophosphite as the antioxidant (phosphorus-containing compound) would be a help for solving the problem. It was, however, also found that a calcium salt, such as calcium hypophosphite, is less soluble in the straight chain aliphatic α,ω-dicarboxylic acid having 4 to 20 carbon atoms, and white foreign matters occur when the amount of addition thereof increases to degrade appearance of the molded article. Based on these findings, the invention succeeded in providing a polyamide resin that can yield a molded article with good appearance and good solder reflowability, by controlling the ratio of phosphorus atom and calcium atom within the above-described range.

The polyamide resin of this invention also succeeded in achieving high transparency. In particular, it can keep a high level of transparency even after heat treatment, and after enhancing the degree of crystallinity.

In this invention, 70 mol % or more of structural unit derived from diamine is derived from 1,4-bis(aminomethyl) cyclohexane. As for structural unit derived from diamine, preferably 71 mol % or more, more preferably 75 mol % or more, even more preferably 80 mol % or more, yet more preferably 90 mol % or more, furthermore preferably 95 mol % or more, particularly preferably 98 mol % or more, and especially preferably 99 mol % or more thereof is derived from 1,4-bis(aminomethyl)cyclohexane.

Diamines other than 1,4-bis(aminomethyl)cyclohexane is exemplified by aliphatic diamines such as 1,3-bis(aminomethyl)cyclohexane, tetramethylenediamine, pentamethylenediamine, hexamethylenediamine, octamethylenediamine, and nonamethylenediamine; and aromatic diamines such as paraphenylenediamine, metaxylylenediamine, and paraxylylenediamine. Only one type, or two or more types of such other diamines may be used.

1,4-Bis(aminomethyl)cyclohexane, which is the starting diamine of the polyamide resin, includes cis isomer and trans isomer. In this invention, molar ratio (cis:trans) of 1,4-bis(aminomethyl)cyclohexane is 35:65 to 0:100, preferably 45:55 to 0:100, more preferably 40:60 to 0:100, even more preferably 30:70 to 0:100, yet more preferably 20:80 to 0:100, furthermore preferably 17:83 to 0:100, and may even be 10:90 to 0:100. Within these ranges, polyamide resin having a high degree of crystallinity, and high melting point is obtained.

In this invention, 70 mol % or more of the structural unit derived from dicarboxylic acid is derived from a straight chain aliphatic α,ω-dicarboxylic acid having 8 to 12 carbon atoms. As for the structural unit derived from dicarboxylic acid, preferably 80 mol % or more, more preferably 90 mol % or more, particularly 95 mol % or more, even more preferably 98 mol % or more, and yet more preferably 99 mol % or more thereof is derived from the straight chain aliphatic α,ω-dicarboxylic acid having 8 to 12 carbon atoms.

The straight chain aliphatic α,ω-dicarboxylic acid having 8 to 12 carbon atoms is preferably suberic acid, azelaic acid, sebacic acid, 1,9-nonanedicarboxylic acid, or 1,10-decanedicarboxylic acid. Sebacic acid is more preferable. Only one type, or two or more types of the straight chain aliphatic α,ω-dicarboxylic acid having 8 to 12 carbon atoms may be used. Use of such polyamide resin is beneficial, since the obtainable polyamide resin will tend to have further reduced water absorption rate.

Employable dicarboxylic acid other than the straight chain aliphatic α,ω-dicarboxylic acid having 8 to 12 carbon atoms is exemplified by aliphatic dicarboxylic acid having 7 or less carbon atoms, and alicyclic dicarboxylic acid having 6 to 12 carbon atoms. Specific examples include succinic acid, glutaric acid, adipic acid, 1,4-cyclohexane dicarboxylic acid, and 1,3-cyclohexane dicarboxylic acid. Note that the ratio of mixing of isophthalic acid in the polyamide resin of this invention is less than 10 mol %.

Besides the diamine component and the dicarboxylic acid component, the polyamide resin of this invention may use, as a copolymerization component, lactams such as ε-caprolactam and laurolactam; and aliphatic aminocarboxylic acids such as aminocaproic acid and aminoundecanoic acid, without adversely affecting the effects of this invention. However, the polyamide resin of this invention is typically such that 90 mol % or more of the whole structural unit thereof is composed of the structural unit derived from diamine and the structural unit derived from dicarboxylic acid; and more preferably 95 mol % or more, even more preferably 98 mol % or more, yet more preferably 99 mol % or more, furthermore preferably substantially 100 mol % is composed of the structural unit derived from diamine and the structural unit derived from dicarboxylic acid.

Various thermal properties and the degree of crystallinity of the polyamide resin of this invention are preferably as follows. Within these ranges, the effects of this invention will more effectively be demonstrated. The methods of measurement enumerated below will follow the methods described later in EXAMPLES. Note however that instruments, etc. used in EXAMPLES are hardly available due to discontinuation or other reasons, applicable values may be those obtained by measurement using other equivalent instruments.

The polyamide resin of this invention preferably has a melting point (Tm) of 230° C. or above, which is more preferably 240° C. or above, even more preferably 250° C. or above, yet more preferably 256° C. or above, furthermore preferably 260° C. or above, still further preferably 270° C. or above, and particularly preferably 280° C. or above. The upper limit value is not specifically limited, but may typically be 320° C. or below, and may further be 300° C. or below.

The polyamide resin of this invention may have a single, or two or more melting points. When there are two or more melting points, the lower limit of the preferable range of melting point means the lowest one of such two or more melting points, meanwhile the upper limit value of the preferable range of melting point means the highest one of such two or more melting points.

The polyamide resin of this invention preferably has a glass transition temperature (Tg) of 80° C. or above, which is more preferably 85° C. or above, even more preferably 90° C. or above, and may even be 94° C. or above. The upper limit value of glass transition temperature is not specifically limited, but may typically be 150° C. or below, may further be 130° C. or below, may particularly be 120° C. or below, and may further particularly be 110° C. or below.

The polyamide resin of this invention preferably has a crystallization temperature during heating (Tch) of 160° C. or below, which is preferably 150° C. or below. The lower limit value of crystallization temperature during heating is preferably 115° C. or above, more preferably 120° C. or above, and even more preferably 122° C. or above.

The polyamide resin of this invention preferably has a crystallization temperature during cooling (Tcc) of 180° C. or above. The upper limit value of crystallization temperature during cooling is preferably 280° C. or below, more preferably 275° C. or below, may be 260° C. or below, and even may be 255° C. or below.

The polyamide resin used in this invention (1,4-BAC10) preferably has a degree of crystallinity, estimated by X-ray diffractometry using the equation below, exceeding 30%, which is more preferably 31% or above, even more preferably 33% or above, yet more preferably 35% or above, furthermore preferably 38% or above, and may even be 40% or above. The upper limit value of the degree of crystallinity is not specifically limited, but may preferably be 60% or below, even more preferably 55% or below, may even be 50% or below, and may further be 47% or below.

Within these ranges, the obtainable polyamide resin will have good solder reflowability.

Degree of crystallinity (%)=[Crystalline peak area/ (Crystalline peak area+Amorphous peak area)]× 100

In this invention, it is more preferable to satisfy two or more preferable ranges of Tm, Tg, Tch, Tcc and the degree of crystallinity in a combined manner. Within these ranges, the effects of this invention will more effectively be demonstrated.

The polyamide resin of this invention may have a water absorption rate, measured under a condition at 40° C. with a relative humidity of 90%, of 3.5% or below, which may further be 3.0% or below, and may particularly be 2.8% or below. The lower limit value of water absorption rate is not specifically limited, but may typically be 1.0% or above, and may be practical enough if it is 1.5% or above.

The polyamide resin of this invention contains 20 to 100 ppm by mass of phosphorus atom, and contains calcium atom so that the molar ratio given by (phosphorus atom): (calcium atom) will be 1:0.3 to 0.7. Within the range, the molded article molded from the polyamide resin of this invention will have improved appearance and improved solder reflowability.

The phosphorus atom concentration in the polyamide resin of this invention is preferably 25 ppm by mass or above at the lowest, and is more preferably 30 ppm by mass or above. The phosphorus atom concentration is preferably 80 ppm by mass or below at the highest, and is more preferably 60 ppm by mass or below.

The polyamide resin of this invention preferably has a molar ratio given by (phosphorus atom):(calcium atom) of 1:0.3 to 0.7, which is more preferably 1:0.4 to 0.6, even more preferably 1:0.45 to 0.55, and particularly 1:0.48 to 0.52. Each of phosphorus atom and calcium atom contained in the polyamide resin of this invention is preferably derived from calcium hypophosphite.

The phosphorus atom concentration and the calcium atom are measured according to the methods described later in EXAMPLES.

The polyamide resin of this invention preferably has a number-average molecular weight of 6,000 to 30,000, which is more preferably 10,000 to 25,000.

The number-average molecular weight (Mn) and weight-average molecular weight (Mw) of the polyamide resin may be determined by gel permeation chromatography (GPC), referring to standard polymethyl methacrylate (PMMA) equivalent values.

More specifically, employed were two columns packed with styrene-based polymer as a packing material, and a 2 mmol/L sodium trifluoroacetate solution in hexafluoroisopropanol (HFIP) as a solvent, wherein the measurement may be carried out with a resin concentration of 0.02% by mass, a column temperature of 40° C., and a flow rate of 0.3 mL/min, using a refractive index (RI) detector. The analytical curve may be prepared by using PMMA dissolved in HFIP, with the concentration varied over 6 levels.

The polyamide resin used in this invention preferably has a distribution of molecular weight (weight-average molecular weight/number-average molecular weight (Mw/Mn)) of 1.8 to 3.1. The distribution of molecular weight is more preferably 1.9 to 3.0, and even more preferably 2.0 to 2.9. With the distribution of molecular weight controlled within these ranges, a composite material excellent in mechanical characteristics will more likely be obtained.

The distribution of molecular weight of polyamide resin is controllable by making a suitable choice, for example, on types and amounts of initiator or catalyst used for polymerization, and polymerization conditions including reaction temperature, pressure and time. Alternatively, it is also controllable by mixing two or more types of polyamide resins with different average molecular weights obtained under different polymerization conditions, or by subjecting the polyamide resin after polymerization to fractional precipitation.

The polyamide resin of this invention is a highly transparent resin, and in particular, excels in transparency after heat treatment. For example, change in the YI value (ΔYI value), after heating at 150° C. for 5 hours, may be suppressed to 2.0 or below, and even to 1.5 or below. The lower limit value of ΔYI might ideally be 0, but may be practical enough even if it is 1.0 or above. Also haze, after heating at 150° C. for one hour, may be suppressed to 2.0% or below, and even to 1.5% or below. The lower limit value of haze might ideally be 0%, but may be practical enough even if it is 1.0% or above. Details of methods of measurement of ΔYI value and haze will follow the methods described later in EXAMPLES.

Although the polyamide resin has a general tendency of reducing its transparency as the degree of crystallinity increases, the polyamide resin of this invention can achieve a high degree of crystallinity while keeping the transparency.

<Method for Manufacturing Polyamide Resin>

Next, an exemplary method for manufacturing the polyamide resin of this invention will be described. The polyamide resin of this invention is preferably a polyamide resin manufactured by the method described below, but of course not limited thereto.

The method for manufacturing a polyamide resin of this invention comprises polycondensing a diamine and a dicarboxylic acid in the presence of calcium hypophosphite, wherein 70 mol % or more of the diamine is 1,4-bis (aminomethyl)cyclohexane; 1,4-bis(aminomethyl)cyclohexane has a molar ratio (cis:trans) of 35:65 to 0:100; and 70 mol % or more of the dicarboxylic acid is a straight chain aliphatic α,ω-dicarboxylic acid having 8 to 12 carbon atoms.

According to such synthesis in the presence of calcium hypophosphite, the obtainable polyamide resin will have the phosphorus atom concentration and the calcium atom concentration controlled within predetermined ranges. A part or the whole of calcium hypophosphite is oxidized during polycondensation or secondary processes, into calcium phosphite, calcium phosphate, calcium polyphosphate and so forth. The ratio depends on polycondensation conditions, oxygen concentration during polycondensation, and so forth. Hence in some cases, the polyamide resin obtained by the method for manufacturing a polyamide resin of this invention would have absolutely no calcium hypophosphite contained therein.

The polycondensation is typically melt polycondensation, wherein preferable is a method by which a starting diamine is added dropwise into a molten starting dicarboxylic acid under pressure and heating, so as to allow the mixture to polymerize while removing water released as a result of condensation; or, a method by which a salt composed of a starting diamine and a starting dicarboxylic acid is heated under pressure in the presence of water, and the melt is allowed to polymerize while removing the added water and water released as a result of condensation.

In this invention, calcium hypophosphite is preferably added so that the polyamide resin will have a phosphorus atom concentration of 20 ppm by mass or above, which may be 25 ppm by mass or above, and even may be 30 ppm by mass or above. Calcium hypophosphite is preferably added so as to control phosphorus atom concentration to 100 ppm by mass or below at the highest, which is more preferably 80 ppm by mass or below, and even more preferably 60 ppm by mass or below.

In the process of polycondensation, other alkali metal compound may be used in combination with calcium hypophosphite. By adding alkali metal salt, it will become possible to control rate of amidation.

It is also preferable to increase the molecular weight of polyamide resin through solid phase polymerization.

Regarding other polymerization conditions, the description of JP-A-2015-098669 and International Disclosure WO2012/140785 pamphlet may be referred to, the contents of which are incorporated by reference into this specification.

Details of diamine and dicarboxylic acid are synonymous to those described previously regarding the polyamide resin. The same will apply to preferable ranges.

The polyamide resin of this invention may be used in the form of molded article obtained by molding a composition that contains the polyamide resin. The composition may be composed solely of a single type, or two or more types, of the polyamide resin of this invention, or may contain other component.

As such other component, optionally addable is an additive such as polyamide resin other than the polyamide resin of this invention, thermoplastic resin other than polyamide resin, lubricant, filler, matting agent, heat stabilizer, weathering stabilizer, UV absorber, plasticizer, flame retarder, antistatic agent, anticoloring agent, or antigelling agent. Only one type, or two or more types of these additives may be used.

Alternatively, the composition may be designed to contain substantially no calcium-containing compound. "To contain substantially no . . . " means that the content is 3% by mass or less of the additives, which is preferably 1% by mass or less.

Such other polyamide resin is specifically exemplified by polyamide 6, polyamide 66, polyamide 46, polyamide 6/66 (copolymer composed of polyamide 6 component and polyamide 66 component), polyamide 610, polyamide 612, polyamide 11, and polyamide 12. Only one type, or two or more types of these other polyamide resins may be used.

The thermoplastic resin other than the polyamide resin is exemplified by polyester resins such as polyethylene terephthalate, polybutylene terephthalate, polyethylene naphthalate, and polybutylene naphthalate. Only one type, or two or more types of these thermoplastic resins other than polyamide resin may be used.

The molded article obtained by molding the polyamide resin composition may be used for various molded articles including monolayer or multilayer film, monolayer or multilayer sheet, and monolayer and multilayer molded article. The molded article may be thin molded article or hollow molded article.

Applicable fields of the molded article include parts for automobile and other transportation machine, general machinery parts, precision equipment parts, electronic/electric equipment parts, office automation equipment parts, building material/housing equipment parts, medical device, leisure time/sport goods, playing tools, medical supplies, daily goods including food wrapping film, container for paint or oil, and defense/aerospace products. The polyamide resin of this invention is particularly suitable for printer transfer belt, for its high melting point and good solder reflowability.

EXAMPLES

This invention will more specifically be explained referring to Examples. Materials, amounts of consumption, ratios, details of processes and procedures of processes are suitably modified without departing from the scope of this invention. The scope of this invention is, therefore, by no means limited to the specific Examples below.

In these Examples, 1,4-BAC10 means a polyamide resin synthesized from 1,4-bis(aminomethyl)cyclohexane and sebacic acid as starting materials; and 1,4-BAC6 means a polyamide resin synthesized from 1,4-bis(aminomethyl)cyclohexane and adipic acid as starting materials.

Example 1

Exemplary Synthesis: 1,4-BAC10

Into a 50 L-(inner capacity) pressure reactor equipped with a stirrer, a partial condenser, a total condenser, a pressure regulator, a thermometer, a dropping tank, a pump, an aspirator, a nitrogen gas feeding tube, a bottom drain valve, and a strand die, placed were precisely weighed 10,000 g (49.44 mol) of sebacic acid (from Itoh Oil Chemicals Co., Ltd.), 2.5 g (0.015 mol) of calcium hypophosphite (from Kanto Chemical Co., Inc.), and 1.6 g (0.02 mol) of sodium acetate (from Kanto Chemical Co., Inc.), the content of the reactor was thoroughly replaced with nitrogen gas, the reactor was then tightly closed, and was heated up to 200° C. under stirring, while keeping the inner pressure at 0.4 MPa. Upon reaching 200° C., dropwise addition of 7,010 g (49.53 mol) of 1,4-bis(aminomethyl)cyclohexane (molar ratio cis:trans=15:85) (from Mitsubishi Gas Chemical Company, Inc.) having been reserved in the dropping tank, into the starting materials in the reactor was started, and the reactor was heated up to 300° C., while keeping the inside of the reactor at 0.4 MPa, and removing water resulted from condensation. Upon completion of the dropwise addition of 1,4-bis(aminomethyl)cyclohexane, the inside of reactor was gradually returned to the normal pressure, and then evacuated using the aspirator down to 80 kPa, to remove the water resulted from the condensation. During the evacuation, agitation torque of the stirrer was monitored, and upon reaching a predetermined torque, the stirring was stopped, the inside of reactor was pressurized with nitrogen gas, the bottom drain valve was opened, the polymer was drawn out through the strand die, cooled, and pelletized to obtain a polyamide resin with a number-average molecular weight (Mn) of 12,000.

The obtained polyamide resin was evaluated as described below.

<Method for Measuring Phosphorus Atom Concentration and Calcium Atom Concentration>

Mixed were 0.2 g of polyamide resin and 8 mL of a 35% by mass aqueous nitric acid solution, and the mixture was subjected to microwave digestion at 230° C. for 30 minutes. The obtained digestate was diluted with ultrapure water up to a predetermined volume, to be used as a sample liquid for ICP analysis. Using an ICP analyzer, the phosphorus atom concentration and the calcium atom concentration in the polyamide resin were measured.

For the measurement, the polyamide resin to be measured was used in the form of pellets obtained above. The polyamide resin and the aqueous nitric acid solution were placed in a vessel made of a modified polytetrafluoroethylene, and subjected to microwave digestion. ETHOS One from Milestone General K.K. was used for the microwave digestion. An ICP analyzer employed here was ICPE-9000 from Shimadzu Corporation.

<Method for Measuring Glass Transition Temperature (Tg), Melting Point (Tm) and Crystallization Temperatures (Tch, Tcc)>

Differential scanning calorimetry was conducted in accordance with JIS K 7121 and K 7122. Using a differential scanning calorimeter, the polyamide resin pellets obtained above were crushed, placed in a pan of the differential scanning calorimeter, heated in a nitrogen gas atmosphere up to 300° C. at a heating rate of 10° C./min, then slowly cooled down to 30° C. at 10° C./min for pretreatment, followed by measurement. Measurement conditions include a heating rate of 10° C./min, holding at 300° C. for 5 minutes, and a cooling rate of −5° C./min down to 100° C. Glass transition temperature (Tg), crystallization temperature during heating (Tch), crystallization temperature during cooling (Tcc) and melting point (Tm) were thus determined.

The differential scanning calorimeter used here was "DSC-60" from Shimadzu Corporation.

<Method for Measuring Degree of Crystallinity>

<<Manufacture of Film>>

The polyamide resin pellets obtained above were fed to a twin screw extruder equipped with a T-die, melt-kneaded at a temperature of Tm+15° C., and extruded through the T-die to obtain a film of 200 μm thick.

<<Measurement of Degree of Crystallinity>>

The polyamide resin was analyzed using an X-ray diffractometer (XRD). The degree of crystallinity was calculated based on the equation below, using observed crystalline peak area and amorphous peak area.

Degree of crystallinity (%)=[Crystalline peak area/
(crystalline peak area+amorphous peak area)]×
100

In this Example, the polyamide resin film obtained above was used as the polyamide resin. The X-ray diffractometer employed here was SmartLab from Rigaku Corporation.

<Manufacture of Test Piece>

The pellets obtained above were dried at 80° C. for 5 hours, and made into an ISO tensile test piece (4 mm thick) by injection molding, using an injection molding machine "SE130-DU" from Sumitomo Heavy Industries, Ltd., while setting the cylinder temperature as listed in Table 1, and setting the die temperature to 130° C.

<Appearance of Molded Article>

Appearance of the obtained test piece (molded article) was visually observed.

A: Molded article with good appearance was obtained.
B: Molded article found to have white turbidity.
C: Molded article found to include foreign matter.

<Water Absorption Rate>

The test piece was allowed to stand still in an atmosphere at 40° C. with a relative humidity of 90%, the mass thereof after 500 hour standing was measured, and water absorption rate was calculated based on the masses before and after the standing.

Water absorption rate (%)=[(Mass of test piece after
testing−mass of test piece before testing)/mass
of test piece before testing]×100

<Solder Reflow Test>

The test piece was dipped in a solder reflow bath (compact reflow oven "FT-02", from Anbe SMT Co.) under conditions below, and the appearance was visually observed.

Test conditions: heating at 180° C. for 30 seconds, followed by heating at 260° C. for 5 minutes A: No change found on test piece between before and after testing.
B: Slight blister found on test piece after testing.
C: Blister on test piece found after heating, practically not acceptable.

<Difference of YI Value (ΔYI Value) before and after Heating at 150° C. for 5 Hours>

The pellets obtained above were measured regarding the yellowness (YI value) before and after heating at 150° C. for 5 hours. Difference of yellowness (YI value) between before and after the heating at 150° C. for 5 hours (YI value after heating−YI value before heating) was termed ΔYI value. A measuring instrument employed here was a color-turbidity meter ("COH-300A" from Nippon Denshoku Industries, Ltd.).

<Haze after Heating at 150° C. for One Hour>

The polyamide resin pellets obtained above were fed to a twin screw extruder equipped with a T-die, melt-kneaded at a temperature of Tm+15° C., and extruded through the T-die to obtain a polyamide resin film of 100 μm thick.

The thus obtained 100 μm thick polyamide resin film was measured regarding haze after heating at 150° C. for one hour. The haze was measured in accordance with JIS K 7136. A measuring instrument employed here was a color-turbidity meter ("COH-300A", from Nippon Denshoku Industries, Ltd.).

Example 2

Exemplary Synthesis: 1,4-BAC10

All conducted in the same way as in Example 1, except that a polyamide resin with a molar ratio (cis:trans) of 30:70 was used as 1,4-BAC, and that the inside of reactor after the dropwise addition was heated to 275° C.

<Evaluation>

The thus obtained polyamide resin was evaluated in the same way as in Example 1.

Example 3

Exemplary Synthesis: 1,4-BAC10

All conducted in the same way as in Example 1, except that the amount of addition of calcium hypophosphite was controlled so that the polyamide resin will have a phosphorus atom concentration of 20 ppm by mass.
<Evaluation>
The thus obtained polyamide resin was evaluated in the same way as in Example 1.

Example 4

Exemplary Synthesis: 1,4-BAC10

All conducted in the same way as in Example 1, except that the amount of addition of calcium hypophosphite was controlled so that the polyamide resin will have a phosphorus atom concentration of 100 ppm by mass.
<Evaluation>
The thus obtained polyamide resin was evaluated in the same way as in Example 1.

Example 5

Exemplary Synthesis: 1,4-BAC10

All conducted in the same way as in Example 1, except that a polyamide resin with a molar ratio (cis:trans) of 5:95 was used as 1,4-BAC, and that the inside of reactor after the dropwise addition was heated to 310° C.
<Evaluation>
The thus obtained polyamide resin was evaluated in the same way as in Example 1.

Example 6

Exemplary Synthesis: 1,4-BAC10

All conducted in the same way as in Example 1, except that a polyamide resin with a molar ratio (cis:trans) of 1:99 was used as 1,4-BAC, and that the inside of reactor after the dropwise addition was heated to 315° C.
<Evaluation>
The thus obtained polyamide resin was evaluated in the same way as in Example 1.

Comparative Example 1

Exemplary Synthesis: 1,4-BAC10

All conducted in the same way as in Example 1, except that calcium hypophosphite was changed to 1.59 g of sodium hypophosphite (polyamide resin will have a phosphorus atom concentration of 40 ppm by mass).
<Evaluation>
The thus obtained polyamide resin was evaluated in the same way as in Example 1.

Comparative Example 2

Exemplary Synthesis: 1,4-BAC10

All conducted in the same way as in Example 1, except that the amount of addition of calcium hypophosphite was changed so that the polyamide resin will have a phosphorus atom concentration of 5 ppm by mass.
<Evaluation>
The thus obtained polyamide resin was evaluated in the same way as in Example 1.

Comparative Example 3

Exemplary Synthesis: 1,4-BAC10

All conducted in the same way as in Example 1, except that the amount of addition of calcium hypophosphite was changed so that the polyamide resin will have a phosphorus atom concentration of 150 ppm by mass.
<Evaluation>
The thus obtained polyamide resin was evaluated in the same way as in Example 1.

Comparative Example 4

Exemplary Synthesis: 1,4-BAC10

All conducted in the same way as in Example 1, except that a polyamide resin with a molar ratio (cis:trans) of 60:40 was used as 1,4-BAC, and that the inside of reactor after the dropwise addition was heated to 235° C.
<Evaluation>
The thus obtained polyamide resin was evaluated in the same way as in Example 1.

Comparative Example 5

Exemplary Synthesis: 1,4-BAC6

All conducted in the same way as in Example 1, except that a polyamide resin with a molar ratio (cis:trans) of 50:50 was used as 1,4-BAC, and that sebacic acid was changed to an equimole of adipic acid.
<Evaluation>
The thus obtained polyamide resin was evaluated in the same way as in Example 1.

Comparative Example 6

Exemplary Synthesis: 1,4-BAC10

All conducted in the same way as in Example 1, except that a polyamide resin with a molar ratio (cis:trans) of 38:62 was used as 1,4-BAC, and that the inside of reactor after the dropwise addition was heated to 260° C.
<Evaluation>
The thus obtained polyamide resin was evaluated in the same way as in Example 1.

TABLE 1

| | Example 1 | Example 2 | Example 3 | Example 4 | Example 5 | Example 6 |
| --- | --- | --- | --- | --- | --- | --- |
| Composition | 1,4-BAC10 | 1,4-BAC10 | 1,4-BAC10 | 1,4-BAC10 | 1,4-BAC10 | 1,4-BAC10 |
| Trans-isomer Ratio of 1,4-BAC (mol %) | trans85% | trans70% | trans85% | trans85% | trans95% | trans99% |
| Type of Hypophosphite | Ca Salt | Ca Salt | Ca Salt | Ca Salt | Ca Salt | Ca Salt |
| Addition Amount of Hypophosphite (Phosphorus Concentration Conversion, ppm by mass) | 40 | 40 | 20 | 100 | 40 | 40 |

TABLE 1-continued

|  | Example 1 | Example 2 | Example 3 | Example 4 | Example 5 | Example 6 |
|---|---|---|---|---|---|---|
| Phosphorus Concentration in Resin (ppm by mass) | 40 | 40 | 20 | 100 | 40 | 40 |
| Amount of Ca Rerative to 1 mol of Phosphorus atom in the Resin | 0.5 | 0.5 | 0.5 | 0.5 | 0.5 | 0.5 |
| Cylinder Temperature of Test Piece (° C.) | 293 | 293 | 293 | 293 | 310 | 315 |
| Thermal Properties  Tg (° C.) | 90 | 91 | 90 | 90 | 96 | 95 |
| Tch (° C.) | 123 | 136 | 123 | 123 | 125 | 124 |
| Tm (° C.) | 278 | 261 | 278 | 278 | 283 | 285 |
| Tcc (° C.) | 246 | 210 | 246 | 246 | 261 | 271 |
| Degree of Crystallinity (%) | 42% | 36% | 40% | 39% | 42% | 43% |
| Appearance of Molded Article | A | A | A | A | A | A |
| Water Absorption Rate (%) | 1.9% | 2.2% | 1.9% | 1.9% | 1.8% | 1.8% |
| Solder Reflow Test | A | B | A | A | A | A |
| Difference of YI Value (ΔYI Value) before and after Heating at 150° C. for 5 Hours | 1.2 | 1.3 | 1.4 | 1.2 | — | — |
| Haze after Heating at 150° C. for One Hour (%) | 1.5 | 1.5 | 1.6 | 1.4 | — | — |

TABLE 2

|  | Comparative Example1 | Comparative Example2 | Comparative Example3 | Comparative Example4 | Comparative Example5 | Comparative Example6 |
|---|---|---|---|---|---|---|
| Composition | 1,4-BAC10 | 1,4-BAC10 | 1,4-BAC10 | 1,4-BAC10 | 1,4-BAC6 | 1,4-BAC10 |
| Trans-isomer Ratio of 1,4-BAC (mol %) | trans85% | trans85% | trans85% | trans40% | trans50% | trans62% |
| Type of Hypophosphite | Na Salt | Ca Salt | Ca Salt | Ca Salt | Ca Salt | Ca Salt |
| Addition Amount of Hypophosphite (Phosphorus Concentration Conversion, ppm by mass) | 40 | 5 | 150 | 40 | 40 | 40 |
| Phosphorus Concentration in Resin (ppm by mass) | 40 | 5 | 150 | 40 | 40 | 40 |
| Amount of Ca Rerative to 1 mol of Phosphorus atom in the Resin | 0 | 0.5 | 0.5 | 0.5 | 0.5 | 0.5 |
| Cylinder Temperature of Test Piece (° C.) | 293 | 293 | 293 | 234 | 295 | 260 |
| Thermal Properties  Tg (° C.) | 90 | 90 | 90 | 87 | 110 | 92 |
| Tch (° C.) | 125 | 126 | 123 | 177 | 162 | 143 |
| Tm (° C.) | 278 | 278 | 278 | 219 | 280 | 245 |
| Tcc (° C.) | 244 | 243 | 246 | 154 | 254 | 190 |
| Degree of Crystallinity (%) | 28% | 28% | 42% | 10% | 30% | 30% |
| Appearance of Molded Article | B | B | C | A | A | A |
| Water Absorption Rate (%) | — | — | — | 3.3% | 3.8% | 2.5% |
| Solder Reflow Test | C | C | — | C | A | C |
| Difference of YI Value (ΔYI Value) before and after Heating at 150° C. for 5 Hours | — | — | — | 1.4 | 9.9 | 1.3 |
| Haze after Heating at 150° C. for One Hour (%) | — | — | — | 1.5 | — | 1.4 |

As is clear from Tables above, the polyamide resins of this invention were found to demonstrate high degree of crystallinity, good appearance of the molded articles, low water absorption rate, good solder reflowability, and high translucency after heat treatment (Example 1 to 6). In contrast, when sodium hypophosphite was used, and thereby the calcium atom concentration fell out of the range of this invention (Comparative Example 1), sodium hypophosphite decomposed to allow the phosphorus component to volatilize, although having been added abundantly at the start of synthesis of the resin, found resulted in gelation, and degraded appearance of the molded article obtained by using the resultant polyamide resin. When the phosphorus atom concentration fell below the range of this invention (Comparative Example 2), gelation occurred during synthesis of the resin, thereby the molded article obtained by using the resultant polyamide resin was found to have poor appearance. Meanwhile, when the phosphorus atom concentration exceeded the range of this invention (Comparative Example 3), calcium hypophosphite did not dissolve and did not dissolve but deposited, resulted in poor appearance. Comparative Example 3 was not evaluated by solder reflow test, since the appearance was obviously out of the practically acceptable range.

When the molar ratio of trans isomer of 1,4-BAC was below the range of this invention (Comparative Examples 4, 6), the degree of crystallinity was found to be low, the solder reflowability was found to be poor, and the water absorption rate was high. When a straight chain aliphatic α,ω-dicarboxylic acid having 6 carbon atoms (adipic acid) was used as the dicarboxylic acid (Comparative Example 5), the water absorption rate was found to be high, and the YI value after heat treatment was found to be unfortunately high.

What is claimed is:

1. A polyamide resin, which is composed of a structural unit derived from diamine and a structural unit derived from dicarboxylic acid;
   70 mol % or more of the structural unit derived from diamine being derived from 1,4-bis(aminomethyl)cyclohexane,
   1,4-bis(aminomethyl)cyclohexane having a molar ratio cis:trans of 35:65 to 0:100,
   70 mol % or more of the structural unit derived from dicarboxylic acid being derived from a straight chain aliphatic am-dicarboxylic acid having 8 to 12 carbon atoms, the polyamide resin containing 20 to 100 ppm by mass of phosphorus atom, and containing calcium atom so that the molar ratio given by phosphorus atom:calcium atom will be 1:0.3 to 0.7, wherein the polyamide resin has a solder reflow property such that an ISO tensile test piece having a thickness of 4 mm formed from the polyamide resin is dipped in a solder reflow bath and heated at 180° C. for 30 seconds, followed by heating at 260° C. for 5 minutes, no change is found on the ISO tensile test piece, and wherein the polyamide resin has a degree of crystallinity, estimated by X-ray diffractometry using the equation below, exceeding 38% and not exceeding 60%:

$$\text{Degree of crystallinity (\%)} = [\text{Crystalline peak area} / (\text{Crystalline peak area} + \text{Amorphous peak area})] \times 100.$$

2. The polyamide resin of claim 1, wherein the straight chain aliphatic am-dicarboxylic acid having 8 to 12 carbon atoms is sebacic acid.

3. The polyamide resin of claim 1, having a melting point of 230° C. or higher.

4. The polyamide resin of claim 1, wherein 1,4-bis(aminomethyl)cyclohexane has a molar ratio cis:trans of 30:70 to 0:100.

5. The polyamide resin of claim 1, wherein the calcium atom is derived from calcium hypophosphite.

6. The polyamide resin of claim 2, having a melting point of 230° C. or higher.

7. The polyamide resin of claim 2, wherein 1,4-bis(aminomethyl)cyclohexane has a molar ratio cis:trans of 30:70 to 0:100.

8. The polyamide resin of claim 2, wherein the calcium atom is derived from calcium hypophosphite.

9. The polyamide resin of claim 3, wherein 1,4-bis(aminomethyl)cyclohexane has a molar ratio cis:trans of 30:70 to 0:100.

10. The polyamide resin of claim 3, wherein the calcium atom is derived from calcium hypophosphite.

11. The polyamide resin of claim 4, wherein the calcium atom is derived from calcium hypophosphite.

12. The polyamide resin of claim 1, wherein the straight chain aliphatic am-dicarboxylic acid having 8 to 12 carbon atoms is sebacic acid;

the polyamide resin has a melting point of 230° C. or higher; and 1,4-bis(aminomethyl)cyclohexane has a molar ratio cis:trans of 20:80 to 0:100.

13. The polyamide resin of claim 1, wherein 1,4-bis(aminomethyl)cyclohexane has a molar ratio cis:trans of 20:80 to 0:100.

14. The polyamide resin of claim 1, wherein 1,4-bis(aminomethyl)cyclohexane has a molar ratio cis:trans of 17:83 to 0:100.

15. A molded article obtained by molding a composition that contains the polyamide resin described in claim 1.

16. A method for manufacturing a polyamide resin, comprising polycondensing a diamine and a dicarboxylic acid in presence of calcium hypophosphite, 70 mol % or more of the diamine being 1,4-bis(aminomethyl)cyclohexane, the 1,4-bis(aminomethyl)cyclohexane having a molar ratio cis:trans of 35:65 to 0:100, and 70 mol % or more of the dicarboxylic acid being a straight chain aliphatic am-dicarboxylic acid having 8 to 12 carbon atoms, wherein calcium hypophosphite is added so that the polyamide resin will have a phosphorus atom concentration of 20 to 100 ppm by mass, wherein the polyamide resin has a solder reflow property such that an ISO tensile test piece having a thickness of 4 mm formed from the polyamide resin is dipped in a solder reflow bath and heated at 180° C. for 30 seconds, followed by heating at 260° C. for 5 minutes, no change is found on the ISO tensile test piece, and wherein the polyamide resin has a degree of crystallinity, estimated by X-ray diffractometry using the equation below, exceeding 38% and not exceeding 60%:

$$\text{Degree of crystallinity (\%)} = [\text{Crystalline peak area} / (\text{Crystalline peak area} + \text{Amorphous peak area})] \times 100.$$

* * * * *

UNITED STATES PATENT AND TRADEMARK OFFICE
CERTIFICATE OF CORRECTION

| | |
|---|---|
| PATENT NO. | : 11,225,552 B2 |
| APPLICATION NO. | : 16/074341 |
| DATED | : January 18, 2022 |
| INVENTOR(S) | : Hatsuki Oguro and Tomonori Kato |

It is certified that error appears in the above-identified patent and that said Letters Patent is hereby corrected as shown below:

In the Claims

Column 14, Line (66):
In Claim 1, please delete "am-dicarboxylic" and insert -- a,w-dicarboxylic --, therefor.

Column 15, Line (20):
In Claim 2, please delete "am-dicarboxylic" and insert -- a,w-dicarboxylic --, therefor.

Column 16, Line (5):
In Claim 12, please delete "am-dicarboxylic" and insert -- a,w-dicarboxylic --, therefor.

Column 16, Line (26):
In Claim 16, please delete "am-dicarboxylic" and insert -- a,w-dicarboxylic --, therefor.

Signed and Sealed this
Twenty-third Day of August, 2022

Katherine Kelly Vidal
*Director of the United States Patent and Trademark Office*